(12) United States Patent
Parker

(10) Patent No.: US 6,915,250 B1
(45) Date of Patent: Jul. 5, 2005

(54) CUSTOMER PREMISES SIMULATION FOR A SERVICE PROVIDER

(75) Inventor: Benjamin J. Parker, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 911 days.

(21) Appl. No.: 09/898,550

(22) Filed: Jul. 3, 2001

(51) Int. Cl.$^7$ .......................... G06F 17/50; H04M 3/30
(52) U.S. Cl. ...................... 703/14; 370/249; 370/252; 379/22.01; 379/22.08; 379/27.04; 379/29.02; 716/5
(58) Field of Search .............................. 703/13–15, 21; 327/570; 370/201, 249, 252, 254; 379/21, 22.01, 22.08, 24, 27.01, 27.04, 29.02, 399.01; 716/4, 5

(56) References Cited

U.S. PATENT DOCUMENTS

| | | | | |
|---|---|---|---|---|
| 4,370,741 A | * | 1/1983 | Haass | 370/201 |
| 5,173,896 A | * | 12/1992 | Dariano | 370/249 |
| 5,293,421 A | * | 3/1994 | Zanzig | 379/399.01 |
| 5,761,486 A | * | 6/1998 | Watanabe et al. | 703/21 |
| 5,825,240 A | * | 10/1998 | Geis et al. | 327/570 |

OTHER PUBLICATIONS

Coperich et al., Systematic Development of Transmission–Line Models for Interconnects With Frequency–Dependent Losses, IEEE Transactions on Microwave Theory and Techniques, vol. 49, No. 10, Oct. 2001, pp. 1677–1685.*

Senthinathan et al., Modeling and Simulation of Coupled Transmission Line Interconnects Over a Noisy Reference Plane, IEEE Transactions on Components, Hybrids, and Mnaufacturing Technology, vol. 16, No. 7, Nov. 1993, pp. 705–713.*

Greenberg, The Fat–Pyramid and Universal Parallel Computation Independent of Wire Delay, IEEE Transactions on Computers, vol. 43, No. 12, Dec. 1994, pp. 1358–1364.*

Chowdhury et al., A Transmission Line Simulator for High–Speed Interconnects, IEEE Transactions on Circuits and Systems–II: Analog and Digital Signal Processing, vol. 39, No. 4, Apr. 1992, pp. 201–211.*

(Continued)

*Primary Examiner*—Russell Frejd

(57) ABSTRACT

A simulation system that simulates a customer premises is disclosed that is tunable. The simulation system is comprised of a communication media simulator system and a device simulator system. The communication media simulator system receives a service provider signal from a service provider. The communication media simulator system applies a load to the service provider signal to simulate a length of communication media. The communication media simulator system varies the load to adjust the length of communication media simulated. The device simulator system applies a second load to the service provider signal to simulate at least one customer premises device.

27 Claims, 6 Drawing Sheets

OTHER PUBLICATIONS

D'Amore et al., Theory of Field–Excited Networks, IEEE Transactions on Electromagnetic Compatibility, vol. 38, No. 3, Aug. 1996, pp. 212–220.*

Piedade et al., A Digital Processing Lossy Transmission Line Simulator, 1992 IEEE Int. Symposium on Circuits and Systems, vol. 4, May 1992, pp. 1768–1771.*

Iannone et al., Wavelength–Division Multiplexed Passive Optical Networks as a Multiple Service Provider Access Platform, IEEE, 10th Annual Meeting of the Lasers and Electro–Optics Society, vol. 2, Nov. 1997, pp. 85–86.*

Marthen et al., Acceptance Tests Conducted on Optical Ground Wires for Checking Additional Fibre Length, IEEE, 14th Int. Conference on Electricity Distribution, Part 1–Contributions, Jun. 1997, pp. 40/1–2.*

Christie, A Fractal Analysis of Interconnection Complexity, Proceedings of the IEEE, vol. 81, Issue 10, Oct. 1993, pp. 1492–1499.*

Telebyte Broadband Product Line Data Sheets, telebytebroadband.com, Dec. 2004, 9 pages.*

Model 455—Extended Wideband Local Loop Simulator, http://www.telebytebroadband.com/455.asp, 1 page.

Model 456—Loop Interference Simulator, http://www.telebytebroadband.com/456.asp, 2 pages.

Model 457—Automated Local Extended Wireline Simulator, http://www.telebytebroadband.com/457.asp, 1 page.

Model 458—Multi–Line Simulator, http://www.telebytebroadband.com/458.asp, 2 pages.

* cited by examiner

CUSTOMER PREMISES SIMULATION FOR A SERVICE PROVIDER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to providing a simulation of a customer premises to a service provider.

2. Description of the Prior Art

High-bandwidth communications are becoming customary for both businesses and residences. Customers are requesting more bandwidth from service providers to satisfy their communication needs. Thus, service providers are continually searching for methods and systems to supply the higher bandwidths to their customers.

Many customers are connected to a service provider with copper wiring. The portion of the public network between the phone company and the customer is referred to as the local loop or the "last mile". The local loop often creates bottlenecks for service providers to provide high bandwidth to its customers. One way to overcome the bottleneck of the local loop is to transmit data over a high frequency signal. One example of a service that transmits data over a high frequency signal is Digital Subscriber Line (DSL) service.

One problem is the high frequency signals can be more susceptible to distortion from conditions existing on the local loop. The distance from the service provider can affect a high-frequency signal more significantly than a low frequency signal. Unterminated bridge taps can adversely affect a high frequency signal while not significantly affecting a low frequency signal. A bridge tap is any unterminated portion of a loop not in the direct talking path. Bridge taps are often connected to a length of wire where the wire is not terminated. The unterminated wire, also called the unterminated bridge tap, can act as a tuning stub to high frequency signals. Therefore, unterminated bridge taps and other conditions can affect some types of service. For example, all loading coils and bridge taps should be removed from copper cabling in a local loop before DSL services can be provided. Therefore, service providers may find it advantageous to simulate certain conditions that may affect service.

The use of high-bandwidth technology is often aided by modeling and simulating the local loop. Without the ability to simulate the local loop and a customer premises, service providers may miss opportunities to access potential customers. Also, service providers may not have a cost effective way to determine a quality of service (QoS) for current or potential customers.

Service providers currently use simulators that simulate conditions that could affect communications from the service provider over the local loop. The simulators are generally fixed circuits that apply a load to service provider signals to simulate the effects of customer premises devices, wire lines, bridge taps, and other conditions. Fixed circuits mean that the components that make up the circuits have fixed values. For instance, a resistor has a fixed resistance, an inductor has a fixed inductance, and a capacitor has a fixed capacitance. This is in contrast to variable components. Variable components are components that can be tuned to accommodate different needs. Examples of variable components are variable resistors, variable inductors, and variable capacitors.

Each simulator is a separate circuit with the current systems. For instance, the customer premises device simulator, the wire line simulator, and the bridge tap simulator are all separate circuits. These separate circuits are connected to simulate multiple configurations. If the service provider wants to simulate a complex configuration, then many different circuits have to be connected together. Unfortunately, the multiple circuits and multiple connections can become cumbersome and undesired for the service provider.

The current wire line simulators are fixed circuits that simulate a fixed length of wire on a customer premises. For instance, a wire line simulator could simulate 100 feet of copper wire. Multiple wire line simulators are connected in series to simulate longer lengths of wire. Also, bridge tap simulators are fixed circuits that simulate a fixed length of wire connected to a bridge tap. Unfortunately, the fixed-circuit simulators can only approximate conditions of a customer premises. The fixed-circuit simulators are not tunable and consequently may not be able to simulate conditions that service providers desire.

SUMMARY OF THE INVENTION

The invention helps to solve the above problems with an improved system and method of simulating a customer premises to a service provider. The invention advantageously provides a highly versatile and cost effective way of simulating a customer premises. The invention also gives a service provider more flexibility as to the types of conditions that can be simulated.

One example of the invention includes a simulation system. The simulation system is comprised of a communication media simulator system and a device simulator system. The communication media simulator system is comprised of an interface system and a tunable simulator system. The interface system communicates with a service provider communication link of a service provider. The tunable simulator system receives a service provider signal through the interface system. The tunable simulator system applies a first load to the service provider signal to simulate a length of a communication media. The tunable simulator system varies the first load to adjust the length of communication media simulated. The device simulator system also receives the service provider signal. The device simulator system applies a second load to the service provider signal to simulate at least one customer premises device.

In another example of the invention, the simulation system is housed in a single enclosure. The simulation system advantageously exists in a single enclosure to help avoid cumbersome and confusing connections between multiple circuits.

In another example of the invention, the communication media simulator system comprises a wire line simulator that simulates a length of wire.

In another example of the invention, the device simulator system includes a bridge tap simulator system that simulates an unterminated bridge tap. The bridge tap simulator system is configured to receive the service provider signal and apply a bridge tap load to the service provider signal to simulate the unterminated bridge tap. The bridge tap simulator system is configured to vary the bridge tap load to simulate a variable length of wire connected to the bridge tap.

In another example of the invention, the device simulator system also includes a telephone simulator system that simulates an on-hook condition and an off-hook condition of a telephone.

In another example of the invention, the simulator system also includes an output system. The output system determines simulation results by measuring signals at different locations within the simulator system. The output system then transmits the simulation results to a user interface. The user interface could be a display on the output system, an auxiliary computer, or some other user interface.

In another example of the invention, the simulation system also includes a control system. The control system automatically adjusts the tunable simulator system and/or the bridge tap simulator system to simulate certain conditions for a particular simulation.

DETAILED DESCRIPTION OF THE INVENTION

Figure 1:
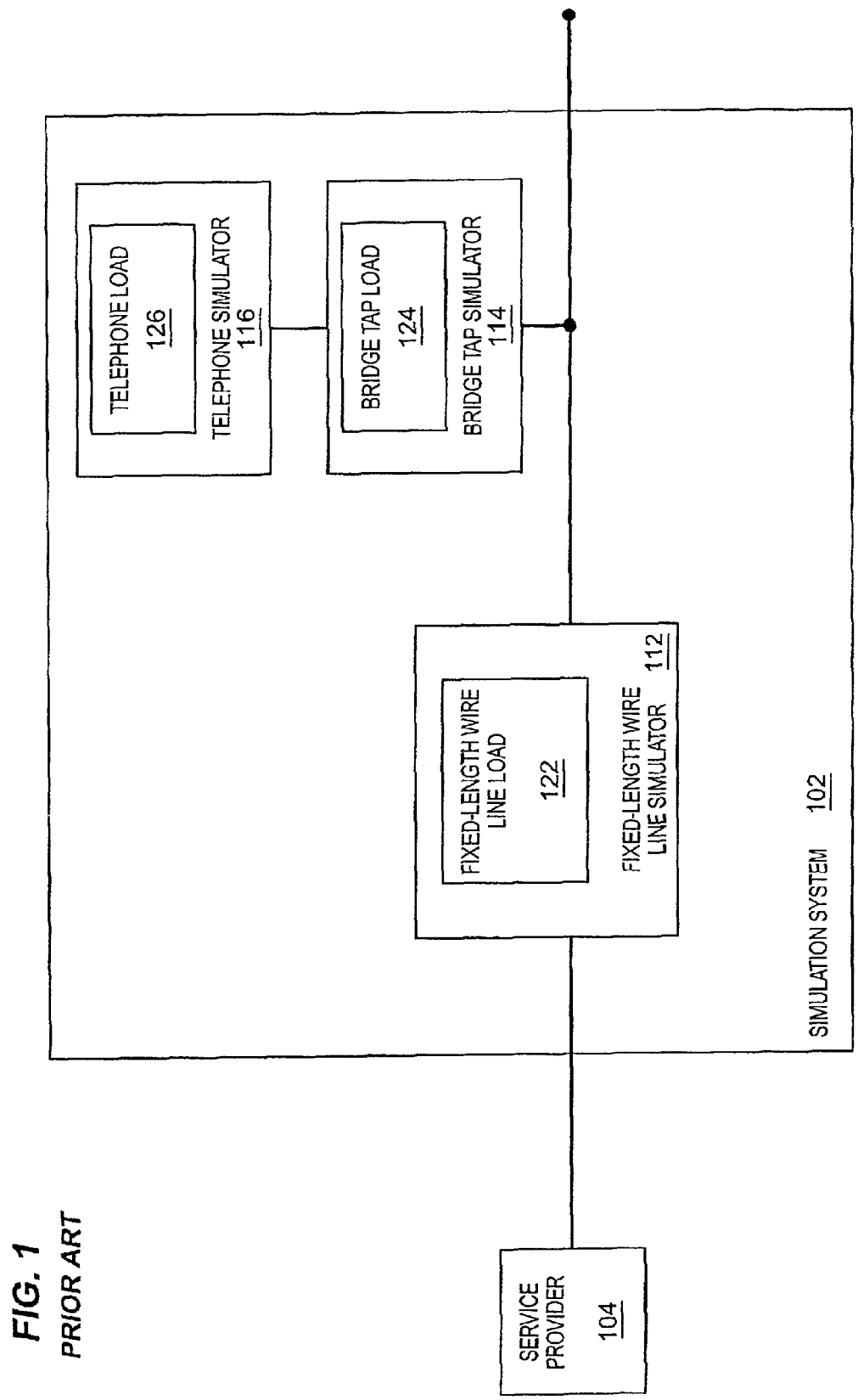
FIG. 1 is a block diagram that illustrates a simulation system in the prior art.
Figure 2:
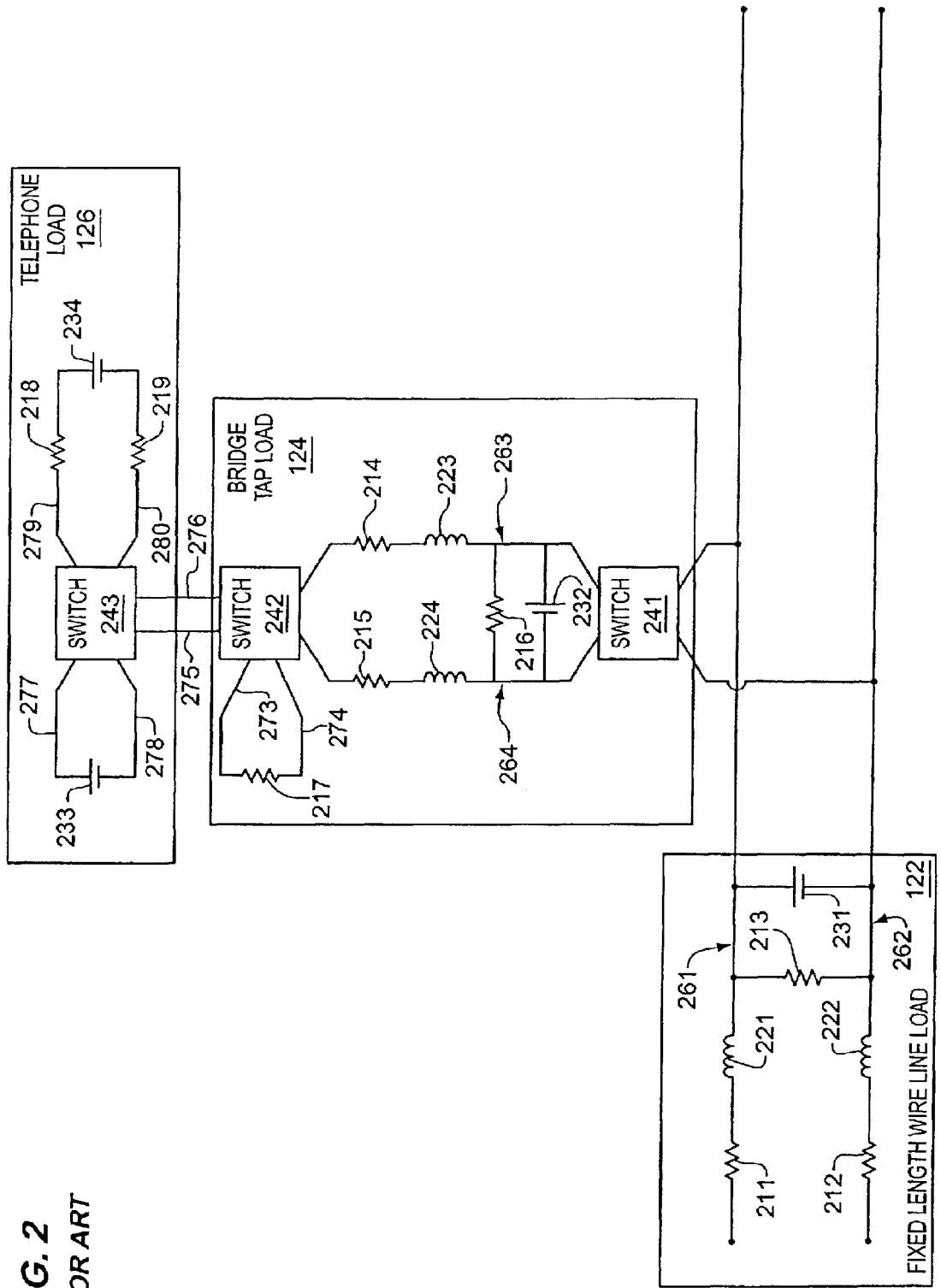
FIG. 2 is a circuit diagram that illustrates the simulator system in FIG. 1 in the prior art.

Prior Art Simulator—FIGS. 1–2

To better understand the invention, FIGS. 1–2 are provided to show the current state of the art. FIG. 1 depicts a simulation system 102 connected to a service provider 104 in the prior art. The simulation system 102 is comprised of a fixed-length wire line simulator 112, a bridge tap simulator 114, and a telephone simulator 116. Fixed-length wire line simulator 112 is comprised of a fixed-length wire line load 122. Bridge tap simulator 114 is comprised of a bridge tap load 124. Telephone simulator 116 is comprised of a telephone load 126. Fixed-length wire line load 122, bridge tap load 124, and telephone load 126 are separate circuits. Fixed-length wire line load 122, bridge tap load 124, and telephone load 126 could be housed in separate enclosures.

In operation, the service provider 104 transmits a service provider signal. Fixed-length wire line simulator 112 applies fixed-length wire line load 122 to the service provider signal to simulate a fixed-length of wire. Bridge tap simulator 114 applies bridge tap load 124 to the service provider signal to simulate an unterminated bridge tap. Telephone simulator 116 applies telephone load 126 to the service provider signal to simulate an off-hook condition or an on-hook condition of a telephone.

FIG. 2 depicts a circuit diagram of fixed-length wire line load 122, bridge tap load 124, and telephone load 126. Fixed-length wire line load 122 is comprised of resisters 211–213, inductors 221–222, and a capacitor 231. Resister 211 and inductor 221 connect in series to a node 261. Nodes 261–264 are referred to in FIG. 2 by arrows for illustrative purposes and those skilled in the art will appreciate that nodes 261–264 are defined by Kirchhoff's Law. Resister 212 and inductor 222 connect in series to node 262. Resistor 213 connects in parallel to node 261 and node 262. Capacitor 231 also connects in parallel to node 261 and node 262.

Bridge tap load 124 is comprised of resisters 214–217, inductors 223–224, a capacitor 232, and switches 241–242. Resister 214 and inductor 223 connect in series to switch 242 and node 263. Resister 215 and inductor 224 connect in series to switch 242 and node 264. Resister 216 and capacitor 232 each connect in parallel between nodes 263–264. Switch 241 connects to nodes 263 and 264. Switch 242 connects to resistor 217 via connections 273 and 274. Switch 241 also connects to nodes 261 and 262 of fixed-length wire line load 122.

Telephone load 126 is comprised of capacitors 233–234, a switch 243, and resistors 218–219. Switch 243 connects to switch 242 of bridge tap load 124 via connections 275 and 276. Switch 243 connects to capacitor 233 via connections 277 and 278. Switch 243 connects to resistor 218 via connection 279. Resistor 218 connects in series to capacitor 234. Capacitor 234 connects in series to resistor 219. Switch 243 connects to resistor 219 via connection 280.

Fixed-length wire line load 122 simulates a fixed-length of wire to service provider 104. For example, fixed-length wire line load 122 could simulate 1000 feet of copper wire. Switch 241 of bridge tap load 124 controls whether to apply bridge tap load 124 to simulate an unterminated bridge tap condition. Like fixed-length wire line load 122, bridge tap load 124 simulates a fixed length of wire connected to a bridge tap. Resistor 217 functions to simulate an unterminated bridge tap. Switch 243 of telephone load 126 controls whether to apply capacitor 233 to simulate an on-hook telephone condition or to apply resistor 218, capacitor 234, and resistor 219 to simulate an off-hook telephone condition. A more detailed description of the operation of loads 122, 124, and 126 is left out for the sake of brevity because one skilled in the art would understand the operation by looking at FIG. 2.

Figure 3:
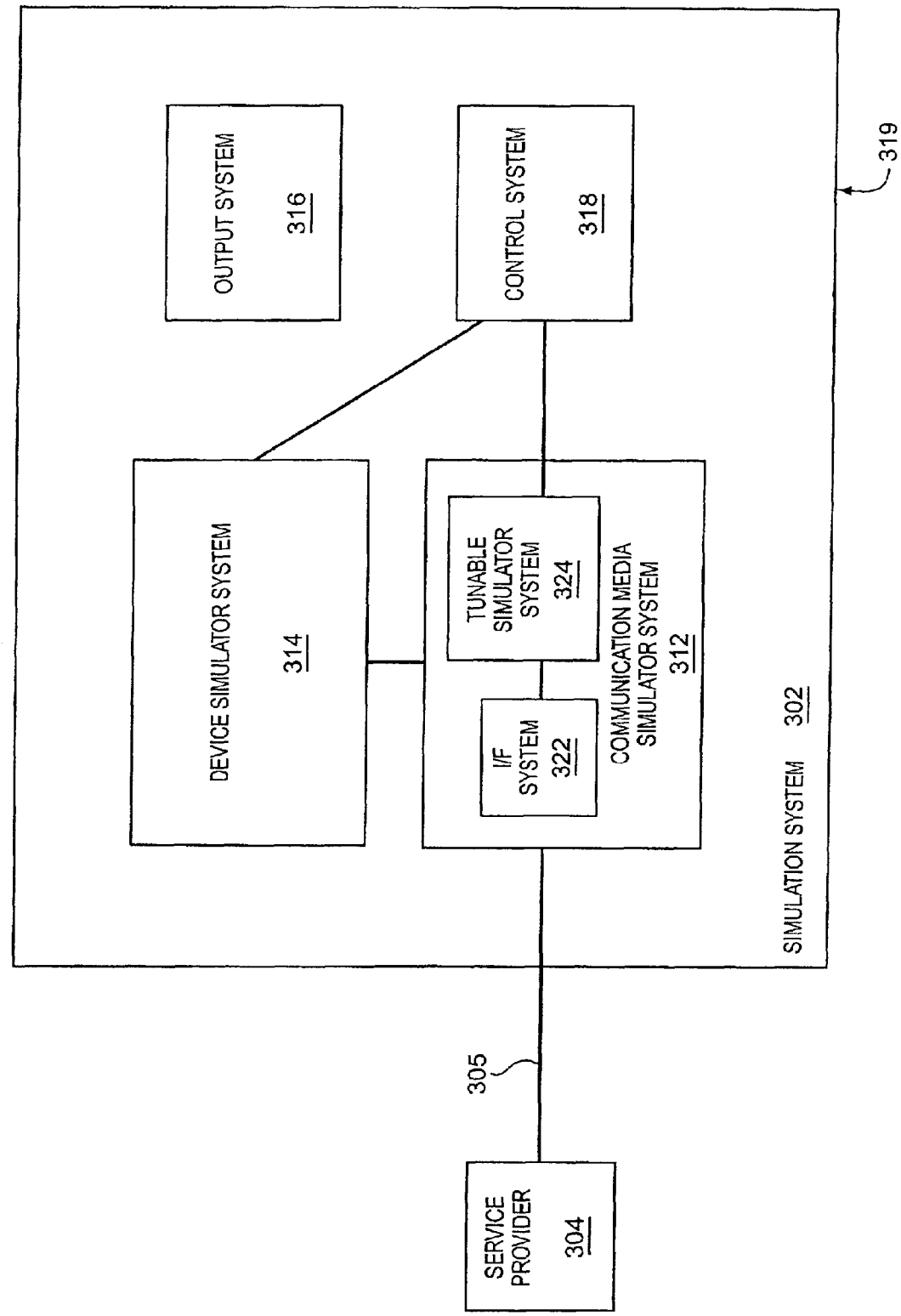
FIG. 3 is a block diagram that illustrates a simulation system in an example of the invention.
Figure 4:
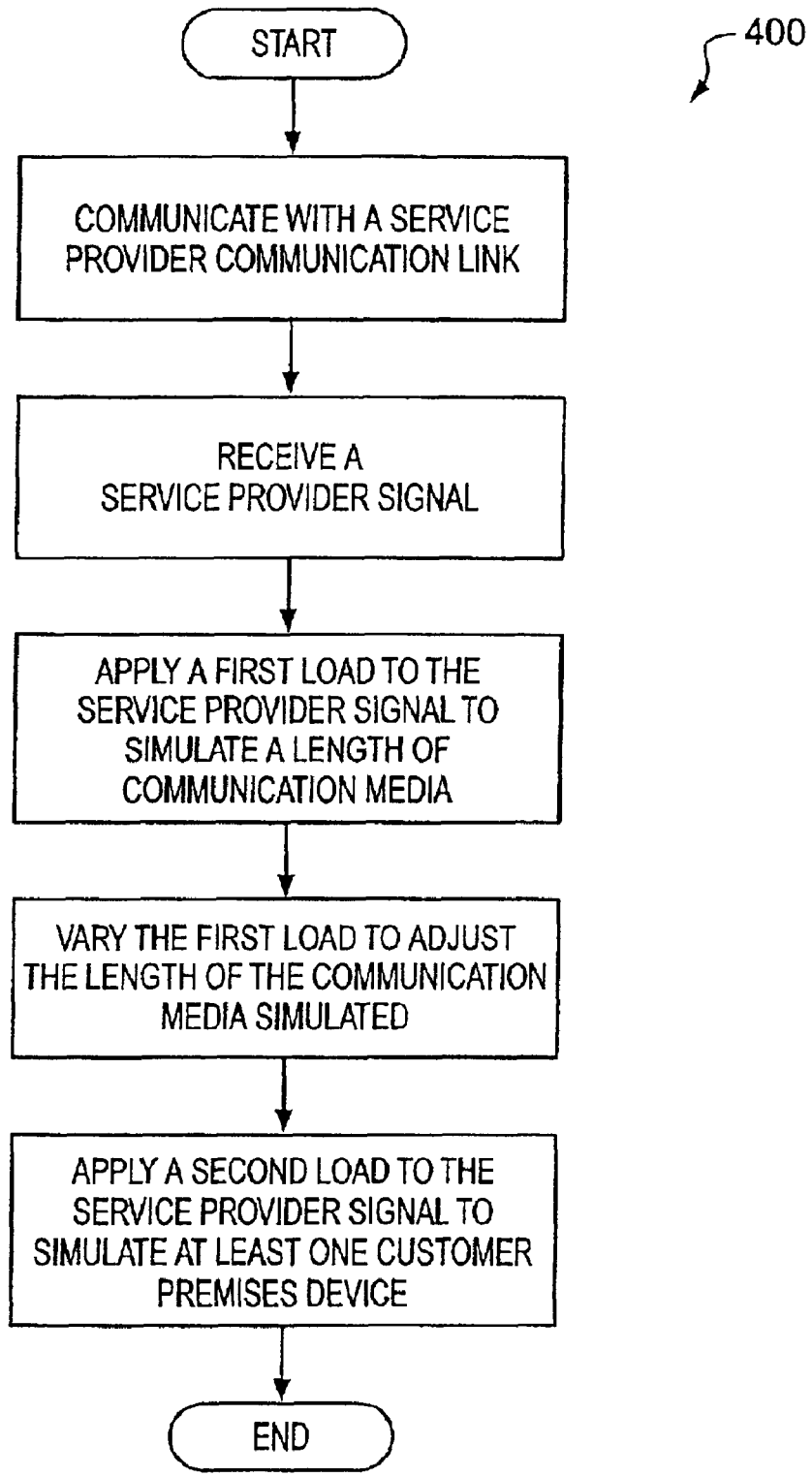
FIG. 4 is a flow diagram that illustrates a process executed by the simulation system in FIG. 3 in an example of the invention.

Simulation System—FIGS. 3–4

FIGS. 3–4 depict a specific example of a simulation system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 3–4 have been simplified or omitted for clarity.

FIG. 3 depicts a simulation system 302 in an example of the invention. Simulation system 302 is configured to communicate with a service provider communication link 305 of a service provider 304. Simulation system 302 is comprised of a communication media simulator system 312 and a device simulator system 314. Communication media simulator system 312 is connected to device simulator system 314 in this example, but those skilled in the art will appreciate that device simulator system 314 could communicate with service provider communication link 305 directly or through intermediary devices. Communication media simulator system 312 is comprised of an interface system 322 connected to a tunable simulator system 324. In some examples, communication media simulator system 312 could be housed in an enclosure 319.

Interface system 322 is any system configured to communicate with a service provider communication link. Tunable simulator system 324 is any system configured to receive a service provider signal, apply a load to the service provider signal to simulate a length of a communication media, and vary the load to adjust the length of communication media simulated. Device simulator system 314 is any system configured to receive a service provider signal and apply a load to the service provider signal to simulate at least one customer premises device. A service provider is any system that provides communications. Some examples of service providers are Internet Service Providers (ISP) and a central office of a phone company. A service provider communication link is any communication path to a service provider. A service provider signal is any signal transmitted by a service provider. One example of a service provider signal is a signal used for Digital Subscriber Line (DSL) service. A communication media is any media that transfers a signal. Some examples of a communication media are wire, coaxial cable, and fiber. A customer premises device is any device used by customers to communicate with a service provider. Some examples of customer premises devices are telephones, facsimiles, and computers with modems.

FIG. 4 is a flow chart depicting a process 400 executed by simulation system 302 in an example of the invention. To start, interface system 322 communicates with service provider communication link 305. Tunable simulator system 324 receives a service provider signal through interface system 322. Tunable simulator system 324 applies a first load to the service provider signal to simulate a length of communication media. Tunable simulator system 324 varies the first load to adjust the length of communication media simulated.

Device simulator system 314 receives the service provider signal from communication media simulator system 312. Device simulator system 314 applies a second load to the service provider signal to simulate at least one customer premises device.

In some examples, simulation system 302 also includes an output system 316. Output system 316 could be connected to many test points in simulation system 302 and can vary depending on different implementations. Output system 316 determines simulation results by measuring signals at different locations. Output system 316 then transmits the simulation results to a user interface. The user interface could be a display on output system 316, an auxiliary computer, or some other user interface.

In some examples, simulation system 302 also includes a control system 318 in communication with any of tunable simulator system 324 or device simulator system 314. Control system 318 adjusts tunable simulator system 324 or the device simulator system 314 for a particular simulation. For instance, a user can pre-program control system 318 with a series of tests to run. Control system 318 tunes tunable simulator system 324 to simulate conditions for the tests. Control system 318 advantageously provides quick and accurate tuning of tunable simulator system 324.

The above-described operations of communication media simulator system 312 and device simulator system 314 could be instructions that are executed by a processor and stored on storage media. As an example, the processor is connected to an analog-to-digital (A/D) converter. The A/D converter converts a service provider signal into a digital signal that the processor can process. The processor modifies the digital signal to simulate a load. The simulated load could be a length of communication media, a customer premises device, or some other device. The processor then transmits the modified digital signal to a digital-to-analog (D/A) converter. D/A converter converts the modified digital signal into an analog signal. The analog signal can then be used to simulate a condition to a service provider.

Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of interoperational processing devices. Some examples of processors are computers, integrated circuits, firmware, and logic circuitry. Those skilled in the art are familiar with instructions, processors, and storage media.

Figure 5:
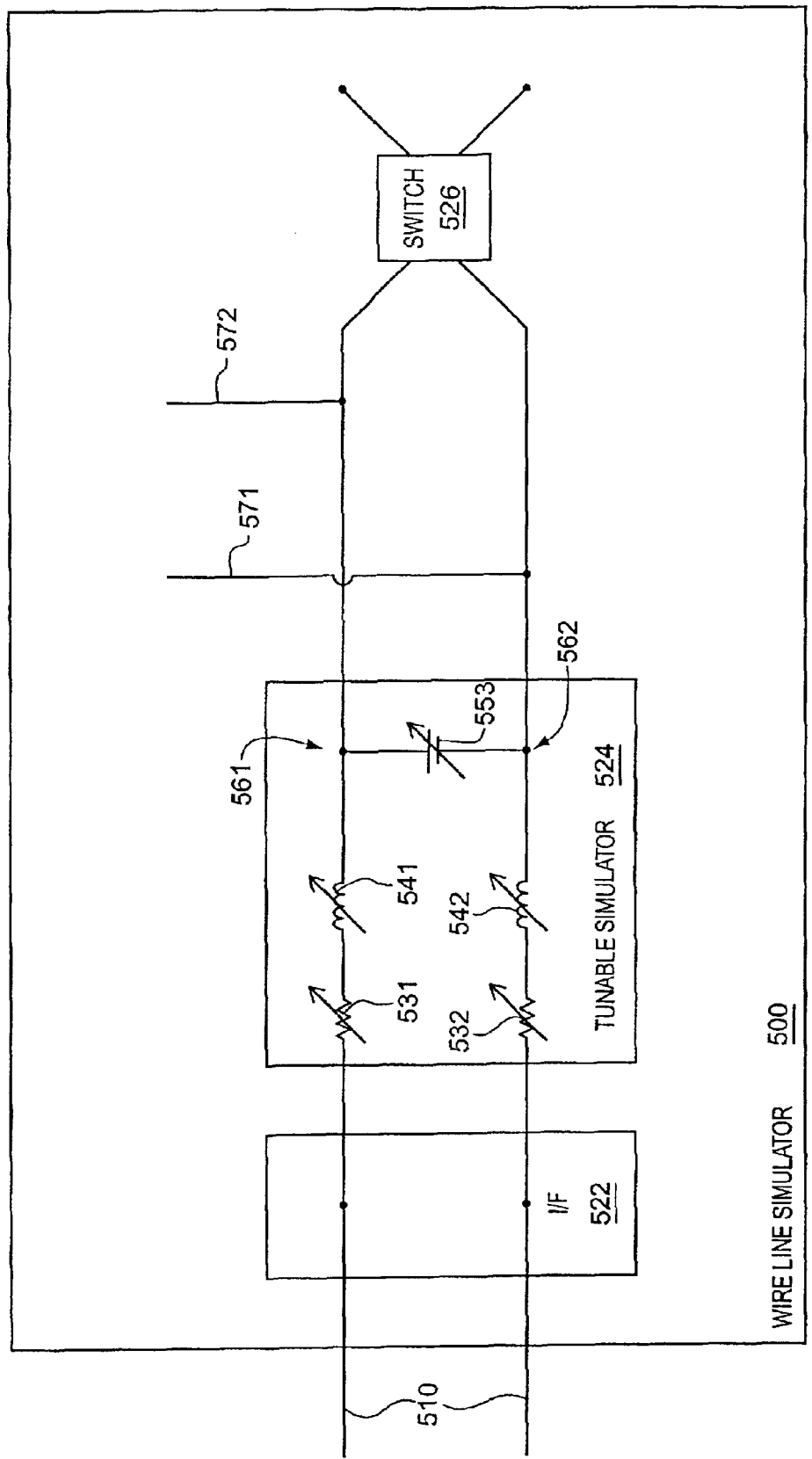
FIG. 5 is a circuit diagram that illustrates a wire line simulator in an example of the invention.

Wire Line Simulator—FIG. 5

FIG. 5 depicts a specific example of a wire line simulator in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 5 have been simplified or omitted for clarity.

FIG. 5 depicts a wire line simulator 500 in an example of the invention. Wire line simulator 500 could be used by simulator system 302 in FIG. 3 as communication media simulator system 312. Wire line simulator 500 is comprised of an interface 522, a tunable simulator 524, and a switch 526. Tunable simulator 524 is comprised of tunable resistors 531–532, tunable inductors 541–542, and a tunable capacitor 553. Tunable resistor 531 and tunable inductor 541 connect in series to a node 561. Tunable resistor 532 and tunable inductor 542 connect in series to a node 562. Tunable capacitor 553 connects in parallel to nodes 561 and 562. Nodes 561–562 are referred to in FIG. 5 by arrows for illustrative purposes and those skilled in the art will appreciate that nodes 561–562 are defined by Kirchhoffs Law.

Tunable resistors 531–532 are 5–20 ohm variable resistors. Tunable inductors 541–542 are 10–100 uH variable inductors. Tunable capacitor 553 is a 0.25–65 pF variable capacitor. Switch 526 is a pushbutton two-circuit switch.

In operation, interface 522 connects tunable simulator 524 to a communication link 510 of a DSL service provider (not shown). Tunable simulator 524 receives DSL signals through interface 522. Tunable simulator, 524 applies a load to the DSL signals to simulate a length of wire. Tunable simulator 524 simulates a wiring on a customer premises ranging from 0 feet to 250 feet. Tunable resistors 531–532, tunable inductors 541–542, and tunable capacitor 553 can be tuned to simulate different lengths of wire, different gauges of wire, and different temperatures. Switch 526 provides an interface to connect other simulator systems to wire line simulator 500. Connections 571 and 572 illustrate where bridge tap simulators, telephone simulators, or other customer premises simulators can be connected. A more detailed description of the operation of wire line simulator system 500 is left out for the sake of brevity because one skilled in the art would understand the operation without undue experimentation by looking at FIG. 5.

Figure 6:
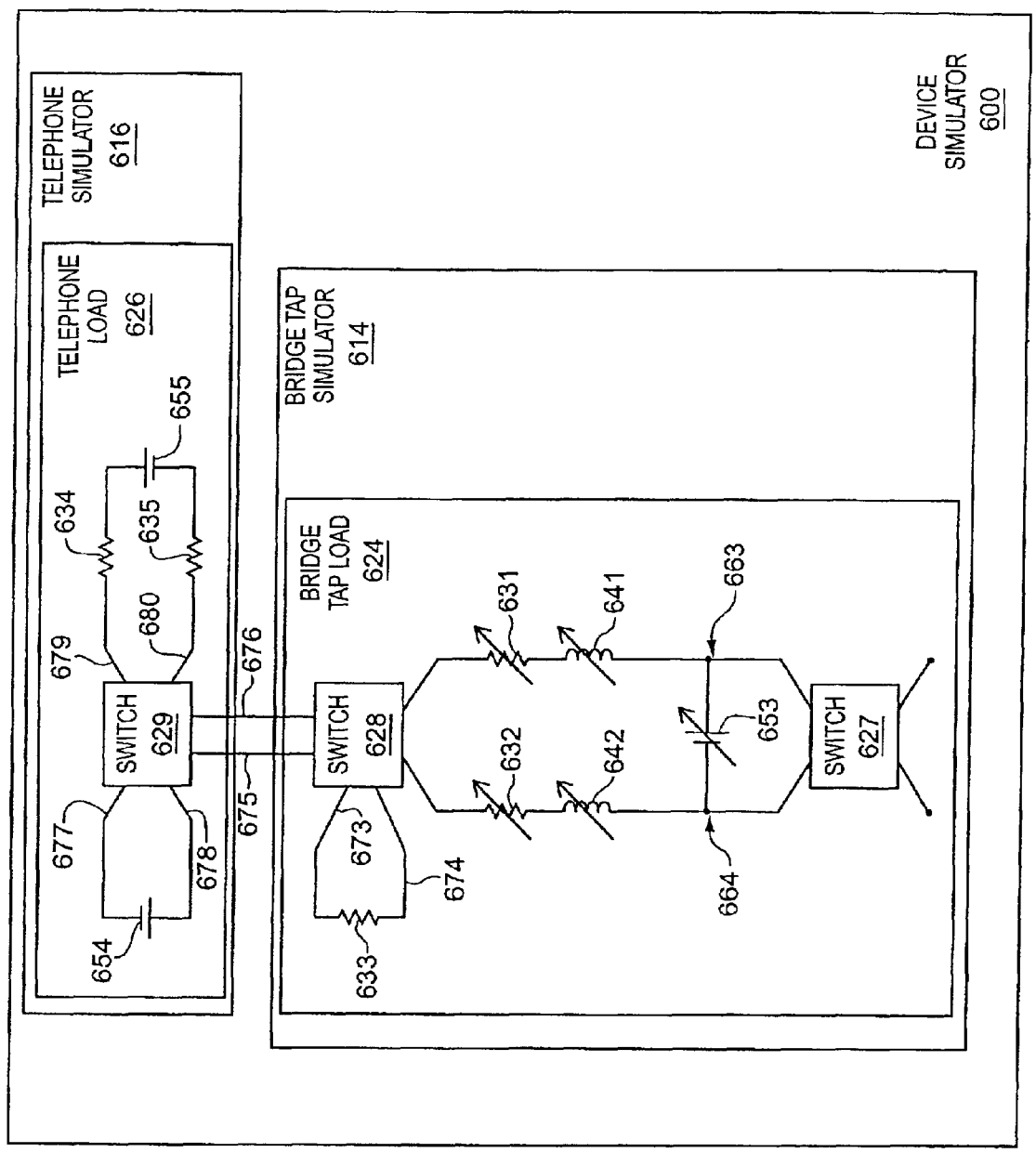
FIG. 6 is a circuit diagram that illustrates a device simulator in an example of the invention.

Device Simulator—FIG. 6

FIG. 6 depicts a specific example of a device simulator in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 6 have been simplified or omitted for clarity.

FIG. 6 depicts a device simulator 600 in an example of the invention. Device simulator 600 could be used by simulator system 302 in FIG. 3 as device simulator system 312. Device simulator 600 is comprised of a bridge tap simulator 614 and a telephone simulator 616.

Bridge tap simulator 614 is comprised of a bridge tap load 624. Bridge tap load 624 is comprised of switches 627–628, tunable resistors 631–632, a resistor 633, tunable inductors 641–642, and a tunable capacitor 653. Tunable resistor 631 and tunable inductor 641 connect in series between switch 628 and a node 663. Tunable resistor 632 and tunable inductor 642 connect in series between switch 628 and a node 664. Tunable capacitor 653 connects in parallel to nodes 663 and 664. Nodes 663–664 are referred to in FIG. 6 by arrows for illustrative purposes and those skilled in the art will appreciate that nodes 663664 are defined by Kirchhoff's Law. Resistor 633 connects to switch 628 via connections 673 and 674. Switch 627 connects to nodes 663 and 664.

Switches 627–628 are dual-pole push button switches. Tunable resistors 631–632 are 5–20 ohm variable resistors. Tunable inductors 641–642 are 10–100 uH variable inductors. Tunable capacitors 653 is a 0.25–65 pF variable capacitor. Resistor 631 is a 1 Mohm resistor.

Telephone simulator 616 is comprised of a telephone load 626. Telephone load 626 is comprised of a switch 629, capacitors 654–655, and resistors 634–635. Switch 629 connects to switch 628 of bridge tap load 624 via connections 675 and 676. Switch 629 connects to capacitor 654 via connections 677 and 678. Switch 629 connects to resistor 634 via connection 679. Resistor 634 connects in series to capacitor 655. Capacitor 655 connects in series to resistor 635. Switch 629 connects to resistor 635 via connection 680. Switch 629 is a dual-pole push button switch. Capacitor 634 is a 470 pF capacitor. Resistor 632 is a 180 ohm resistor. Capacitor 635 is a 4300 pF capacitor. Resistor 633 is a 720 ohm resistor.

In operation, switch 627 of bridge tap load 624 controls whether to apply bridge tap load 624 to simulate an unterminated bridge tap condition. Resistor 633 functions to simulate the unterminated bridge tap condition. Tunable resistors 631–632, tunable inductors 641–642, and tunable capacitor 653 function to simulate a length of wire connected to a bridge tap. Tunable resistors 631–632, tunable inductors 641–642, and tunable capacitor 653 can be varied to adjust the length of wire connected to the bridge tap being simulated by bridge tap load 624. Switch 629 of telephone load 626 controls whether to apply capacitor 654 to simulate an on-hook telephone condition or to apply resistor 634, capacitor 655, and resistor 635 to simulate an off-hook telephone condition. A more detailed description of the operation of device simulator 600 is left out for the sake of brevity because one skilled in the art would understand the operation without undue experimentation by looking at FIG. 6.

Those skilled in the art will appreciate variations of the above-described embodiments that fall within the scope of the invention. As a result, the invention is not limited to the specific examples and illustrations discussed above, but only by the following claims and their equivalents.

I claim:

1. A simulation system configured to simulate a customer premises for a service provider, the simulation system comprising:

a communication media simulator system comprising:
an interface system configured to communicate with a service provider communication link, and
a tunable simulator system configured to receive the service provider signal through the interface system, apply a first load to the service provider signal to simulate a length of communication media, and vary the first load to adjust the length of communication media simulated; and a device simulator system configured to receive the service provider signal from the communication media simulator system and apply a second load to the service provider signal to simulate at least one customer premises device.

2. The simulation system of claim 1 wherein the communication media comprises a wire.

3. The simulation system of claim 1 further comprising an output system configured to:
determine simulation results from at least one of the communication media simulator system and the device simulator system; and
transmit the simulation results to a user interface.

4. The simulation system of claim 1 wherein the tunable simulator system comprises a variable resistor.

5. The simulation system of claim 1 wherein the tunable simulator system comprises a variable inductor.

6. The simulation system of claim 1 wherein the tunable simulator system comprises a variable capacitor.

7. The simulation system of claim 1 further comprising:
a control system configured to automatically vary the first load to adjust the length of the communication media simulated.

8. The simulation system of claim 1 wherein the second load comprises:
a telephone load configured to simulate one of an on-hook condition or an off-hook condition of a telephone.

9. The simulation system of claim 1 wherein the second load comprises:
a bridge tap load configured to simulate an unterminated bridge tap.

10. The simulation system of claim 9 further comprising:
a bridge tap simulation system configured to vary the bridge tap load to simulate a variable length of wire connected to the bridge tap.

11. The simulation system of claim 10 further comprising:
a control system configured to automatically vary the second load to simulate the variable length of wire connected to the bridge tap.

12. The simulation system of claim 1 further comprising:
a switch system connected to the communication media simulator system that is configured to connect the communication media simulator system to other communication media simulator systems to simulate other conditions.

13. The simulation system of claim 1 wherein the service provider signal from the service provider comprises a signal for Digital Subscriber Line (DSL) service.

14. The simulation system of claim 1 further comprising:
an enclosure configured to house the communication media simulator system and the device simulator system.

15. A method of operating a simulation system to simulate a customer premises to a service provider, the method comprising:
receiving a service provider signal from the service provider;

applying a first load to the service provider signal to simulate a length of communication media;

tuning the first load to adjust the length of communication media simulated; and applying a second load to the service provider signal to simulate at least one customer premises device.

16. The method of claim 15 wherein the communication media comprises a wire.

17. The method of claim 15 further comprising:

determining simulation results responsive to applying at least one of the first load and the second load; and transmitting the simulation results to a user interface.

18. The method of claim 15 wherein tuning the first load comprises:

tuning a variable resistor.

19. The method of claim 15 wherein tuning the first load comprises:

tuning a variable inductor.

20. The method of claim 15 wherein tuning the first load comprises:

tuning a variable capacitor.

21. The method of claim 15 wherein varying the first load to adjust the length of communication media simulated further comprises:

varying the first load automatically using a control system.

22. The method of claim 15 wherein applying the second load further comprises:

applying a telephone load that simulates one of an on-hook condition or an off-hook condition of a telephone.

23. The method of claim 15 wherein applying the second load further comprises:

applying a bridge tap load that simulates an unterminated bridge tap.

24. The method of claim 23 further comprising:

varying the bridge tap load to simulate a variable length of wire connected to the bridge tap.

25. The method of claim 24 wherein varying the bridge tap load to simulate a variable length of wire connected to the bridge tap comprises:

varying the second load automatically using a control system.

26. The method of claim 15 further comprising:

connecting other loads to the first load using a switching system to simulate other conditions.

27. The method of claim 15 wherein the service provider signal from the service provider comprises a signal for Digital Subscriber Line (DSL) service.

* * * * *